(12) United States Patent
Whitley et al.

(10) Patent No.: US 7,276,819 B1
(45) Date of Patent: Oct. 2, 2007

(54) EXPLOSIVELY DRIVEN POWER GENERATION, METHOD AND DEVICE

(75) Inventors: Von H. Whitley, Washington, DC (US);
Thomas P. Russell, Manasses, VA (US); Gerardo I. Pangilinan, Alexandria, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/239,446

(22) Filed: Sep. 19, 2005

(51) Int. Cl.
*H02K 44/00* (2006.01)

(52) U.S. Cl. .................... 310/10; 102/207; 89/8

(58) Field of Classification Search ............... 310/10; 102/207, 209
See application file for complete search history.

(56) References Cited

U.S. PATENT DOCUMENTS

| | | | |
|---|---|---|---|
| 3,147,163 A * | 9/1964 | Griffith et al. ............... 149/39 |
| 3,668,065 A * | 6/1972 | Moir ........................... 376/147 |
| 3,878,409 A * | 4/1975 | Gill et al. ...................... 310/11 |
| 3,985,078 A | 10/1976 | Hart et al. ............. 102/70.2 R |
| 4,121,123 A | 10/1978 | Crolius ........................ 310/10 |
| 4,134,034 A * | 1/1979 | Dardai et al. ................. 310/11 |
| 4,370,576 A | 1/1983 | Foster, Jr. et al. ............ 310/10 |
| 4,376,901 A | 3/1983 | Pettibone et al. ............. 310/10 |
| 4,555,972 A * | 12/1985 | Heyne ............................. 89/8 |
| H148 H | 11/1986 | Thompson ...................... 89/8 |
| 4,714,003 A * | 12/1987 | Kemeny .......................... 89/8 |
| 4,862,021 A | 8/1989 | LaRocca ...................... 310/10 |
| 5,059,839 A | 10/1991 | Rose et al. ................... 310/10 |
| 5,493,972 A | 2/1996 | Winterberg et al. ........ 102/305 |
| 2005/0140341 A1* | 6/2005 | Zvezdin et al. ............. 322/2 R |

FOREIGN PATENT DOCUMENTS

JP 6-343254 * 12/1994

* cited by examiner

*Primary Examiner*—Burton Mullins
(74) *Attorney, Agent, or Firm*—Fredric J. Zimmerman

(57) ABSTRACT

A method for generating power including an energetic charge is activated to produce a shockwave, which is imparted at an effective velocity and temperature on a gas to ionize the gas for creating plasma and to drive the plasma. The plasma is impacted on an electrically conducting cable for conducting an electrical charge therethrough.

25 Claims, 2 Drawing Sheets

EXPLOSIVELY DRIVEN POWER GENERATION, METHOD AND DEVICE

GOVERNMENT LICENSING CLAUSE

The invention described herein may be manufactured and used by or for the Government of the United States of America for governmental purposes without the payment of any royalties thereon or therefore.

BACKGROUND OF THE INVENTION

1. Field of the Invention

The present invention relates to a device and method for the generation of an electrical current.

2. Description of Related Art

Many systems, such as rail guns and EMP devices, need short bursts of power supplied to the device. Currently, large numbers of capacitor banks provide this power, requiring the need to house and maintain large capacitor banks that store a relatively small amount of energy for their size. The amount of energy stored in an energetic material is vastly greater than the energy stored in a capacitor.

There is a need for improved methodologies and devices for providing power generation of short bursts of high energy. The present invention addresses this and other needs.

SUMMARY OF THE INVENTION

The present invention includes a method for generating power comprising the steps of activating an energetic charge to produce a shockwave, imparting the shockwave at an effective velocity and temperature on a gas to ionize the gas for creating plasma and to drive the plasma and impacting the plasma on an electrically conducting cable to impart an electrical current and voltage therethrough.

The present invention also includes a method for generating power, comprising the steps of activating an energetic charge having a detonation velocity of at least about 7 mm/μsec to produce a shockwave, imparting the shockwave on a gas at an effective velocity of at least about 6 mm/μsec and a temperature of at least about 10,000° C. and impacting the gas to an electrically conducting cable to impart an electrical current and voltage therethrough.

Additionally, the present invention includes a device for generating power comprising an energetic charge having a detonation velocity of at least 7 mm/μsec, an initiator for activating the energetic charge, an energy-focusing guide operatively associated with the energetic charge to receive a shockwave generated upon activation of the energetic charge, the energy-focusing guide containing a gas and a electrically conducting cable attached to the energy focusing guide to be impacted by the focused shockwave.

The power generated by the present invention is particularly useful for high current, short duration applications, such as a rail gun.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings.

DETAILED DESCRIPTION OF THE INVENTION

Figure 1:
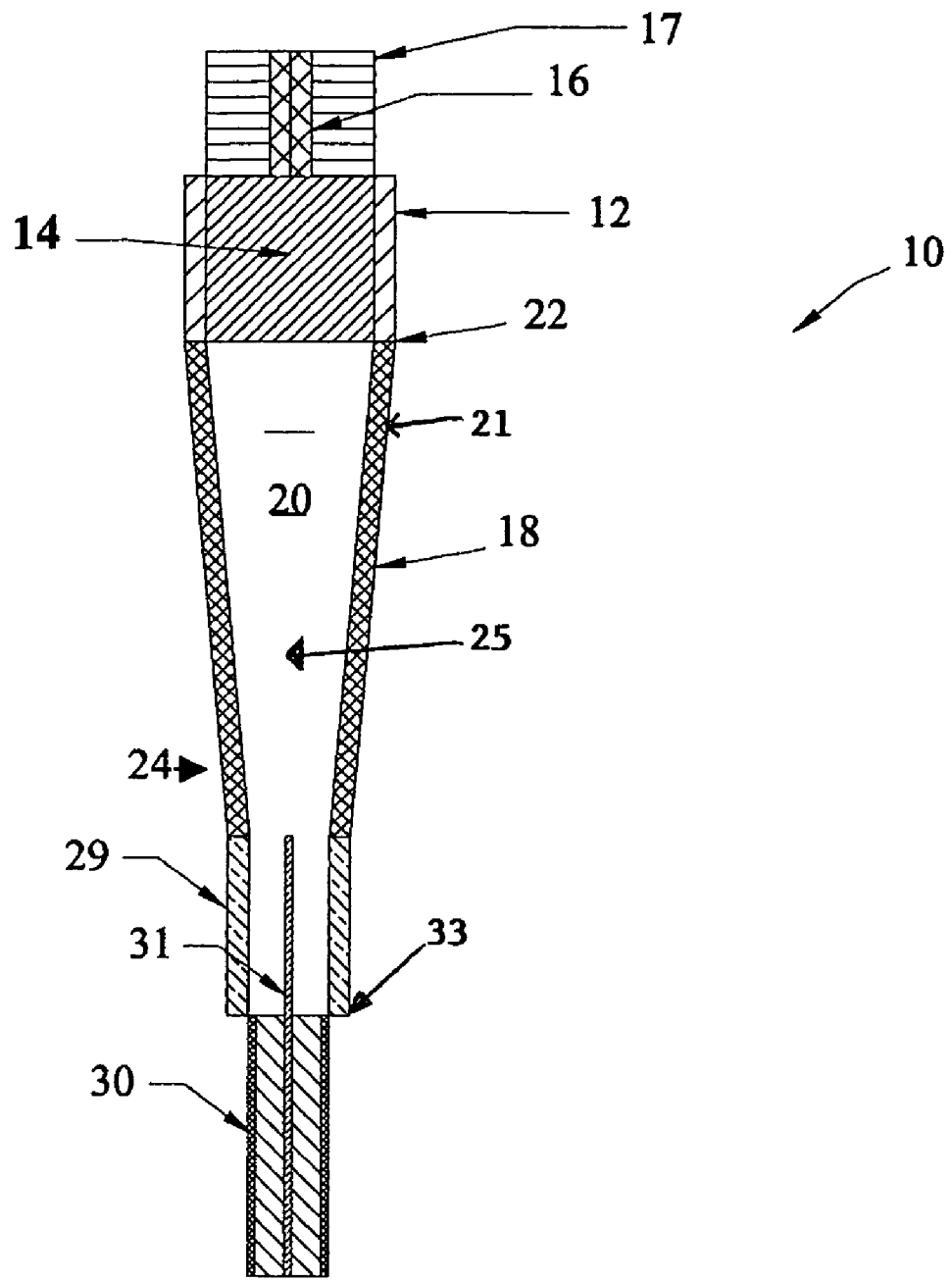
FIG. 1 is a side, cross-sectional view of an explosively induced power generator device according to a first embodiment of the present invention.

Reference will now be made in detail to the present embodiments and methods of the invention as illustrated in the accompanying drawings, in which like reference characters designate like or corresponding parts throughout the drawings. For similar but not identical parts, an alphabetic suffice (e.g., "A") is used. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

It is to be noted that, as used in the specification and the appended claims, the singular forms "a," "an," and "the" include plural referents unless the context clearly dictates otherwise.

Referring now more particularly to the drawings, and in particular FIG. 1, there is shown an explosively induced power generator device 10 according to a first embodiment of the present invention. The device 10 comprises an energetic charge 14, optionally loaded in an optional upper housing 12. In the illustrated embodiment, the optional upper housing 12 is shaped as a cylindrical shell having a closed top end (optionally with a central aperture (not shown)) and an open lower end. The housing 12 may optionally contain a thin insulation layer.

The energetic charge 14, in an embodiment, is a pressable charge, although castable, pourable, or other charges may be used. The energetic charge 14 may include a nitrate-containing compound, and, in particular, an amount of at least about 90 weight percent, and, more particularly, at least about 94 weight percent of the total weight of the charge 14. The nitrate-containing compound may include one, two, three, or more nitrate groups (and, in particular, trinitro or higher), and may be selected, for example, from one or more of the following: a nitramine, such as 1,3,5-trinitro-1,3,5-triaza-cyclohexane (RDX), 1,3,5,7-tetranitro-1,3,5,7-tetraaza-cyclooctane (HMX), and 2,4,6,8,10,12-hexanitro-2,4,6,8,10,12-hexaazatetracyclo-[5.5.0.0$^{5,9}$0$^{3,11}$]-dodecane (CL-20); a nitrate ester, such as, pentaerythritol tetranitrate (PETN), ethylene glycol dinitrate (EGDN), nitroglycerin (NG); and/or other nitrates, such as, trinitrotoluene (TNT), 1,3,5-triamino-2,4,6-trinitrobenzene (TATB), 1,1-diamino-2,2-dinitro ethane (DADNE), and 3-nitro-1,2,4-triazol-5-one (NTO); and others, such as 1,3,3-trinitroazetidine (TNAZ); and combinations.

The energetic charge optionally includes additional ingredients, such as, oxidizers, binders, curing agents, plasticizers, and less desirably, small amounts of metal (e.g., aluminum) and carbon fuel. Examples of oxidizers include nitrates and perchlorates, such as, ammonium perchlorate. Non-energetic binders, energetic binders, or a combination thereof may be used. The binder may be plasticized or unplasticized and may be selected from substituted or unsubstituted oxetane polymers, polyethers, and polycaprolactones. Representative binders that may be selected include, among others, hydroxy-terminated polybutadiene ("HTPB"), polypropylene glycol, polyethylene glycol, poly (glycidyl nitrate) (PGN), poly (nitratomethylmethyl-oxetane) ("poly-NMMO"), glycidyl azide polymer ("GAP"), diethyleneglycol triethyleneglycol nitraminodiacetic acid terpolymer ("9DT-NIDA"), poly(bisazidomethyl-oxetane) ("poly-BAMO"), poly-azidomethyl-methyloxetane ("poly-AMMO"), nitrocellose, polybutadieneacrylonitrile acrylic acid terpolymer ("PBAN"), and combinations and copolymers thereof. The binder formulations will generally include a curative appropriate for the binder. For example, a polyisocyanate curing agent is often used with polyglycidyl nitrate, polyoxetanes, polyglycidyl azide, hydroxy-terminated polybutadienes, and polyethers, whereas an epoxy curing agent is generally used with other binders, such as, PBAN.

Extending into an upper end of the upper housing 12 is an initiator 16 where the initiator 16 rests in an annular housing 17. A portion of the initiator 16 is substantially adjacent to the energetic charge 14. Exemplary initiators 16 include, for example, standard fuse cords, blasting cap (e.g. RP80), electric matches with lead lines, and other known and/or suitable initiators and detonators. In particular, the initiator 16 is capable of a remote activation to place the operator a safe distance from the explosive event of the energetic charge 14. The annular housing 17 may be made of various materials, including acrylics.

An energy-focusing guide 18, also referred to as a shock guide, is connected against and operatively associated with the upper housing 12. The energy-focusing guide 18 includes an internal passageway 20, which extends through the energy-focusing guide 18. In particular, in FIG. 1, the upper housing 12, including the energetic charge 14, is intermediate the initiator 16 and a proximal end 22 of the energy-focusing guide 18. The cross-sectional dimension of the internal passageway 20, in particular, decreases and/or remains constant from the proximal (top in FIG. 1) end 22 to the distal (bottom in FIG. 1) end 24 of the energy-focusing guide 18. In the embodiment shown in FIG. 1, the internal passageway 20 and an exterior surface 21 of the energy-focusing guide 18 continuously tapers at a substantially constant rate from the proximal end 22 to the distal end 24. The proximal end 22 is substantially adjacent to the energetic charge 14. In the device 10A shown in FIG. 2, the internal passageway 20A and an external surface 23 of the energy-focusing guide 18A remain constant in dimension between the proximal end 22A and the distal end 24A. Similarly, the proximal end 22A is substantially adjacent to the energetic charge 14. It should be understood that other cross-sectional profiles are possible, such as those comprising tapering and non-tapering portions, that is, cross-sectional dimensions of the internal passageway 20/20A may include decreasing portions and constant portions. In another embodiment, the internal passageway 20/20A, may taper at a non-constant rate from the proximal end 22/22A to the distal end 24/24A. By providing tapering portions and/or constant portions without an increase in cross-sectional area in a direction of the distal end 24, this configuration keeps shock velocity above the minimal velocity needed to create significant ionization. Accordingly, in the embodiments, as shown in FIGS. 1 and 2, no region of the internal passageway 20/20A increases in cross-sectional dimension between the opposite ends 22/22A and 24/24A.

Figure 2:
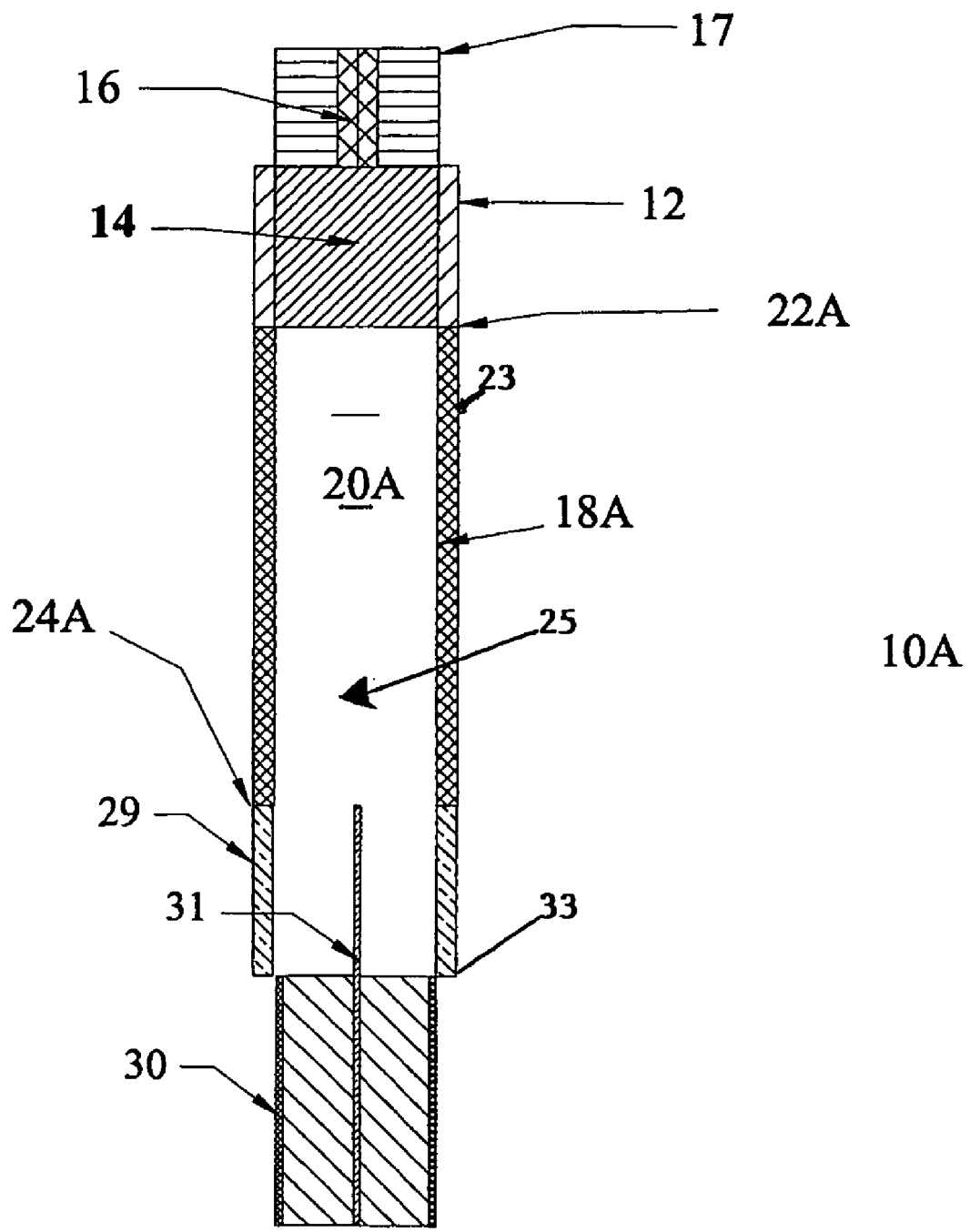
FIG. 2 is a side, cross-sectional view of an explosively induced power generator device according to a second embodiment of the present invention.

Referring to FIGS. 1 and 2, the upper housing 12 and the energy-focusing guide 18/18A may be made of the same or different materials, including, for example, metals, alloys, plastics, composites, paper and pulp products, etc. The materials selected are generally compatible with the intended use environment (e.g., high or low temperature, maritime, etc.) of the device 10.

The internal passageway 20/20A includes and generally is filled with an ionizable gas 25, which is a compressible, ionizable gas. Examples of suitable ionizable gases 25, include, but are not limited to, air, hydrogen, helium, argon, oxygen, and nitrogen, and combinations thereof. The gas 25 is generally maintained at atmospheric pressure, that is, about 1 ATM.

In operation, the distal end 24/24A of the power generating device 10/10A generally is placed in contact with or immediately adjacent an electrically conducting cable, depicted in FIGS. 1 and 2 as a coaxial cable 30. The coaxial cable 30 may include any appropriate metal or composite composition effective for transferring the created charge into the shock guide 18/18A from the distal end 24/24A.

Representative cables 30 include, for example, steel, copper, bronze, silver, gold, and other like conducting materials, in diameters or configurations, such as, 0.5, 1, 2, 3 and consecutively higher inches, and the like, having sufficient resilience to conduct high voltages, such as from about 10 volts, 50 volts, 100 volts, 200, and additional consecutively higher voltages for a given purpose. The contact area between the distal end 24/24A of the shock guide 18 and the coaxial cable 30 may be supported with mounting brackets, sealants or other like holding mechanisms for ensuring a continuous contact of the coaxial cable 30 with the distal end 24/24A of the shock guide 18 prior to an explosive event of the energetic material 14. As shown in FIGS. 1 and 2, the distal end 24/24A was mated to a copper cylinder 29. The coaxial cable 30 was mated to an opposite end 33 of the copper cylinder 29, and a center conductor 31 of the coaxial cable 30 was extended through a bottom, center portion of the copper cylinder 29 to the distal end 24/24A of the shock guide 18. This configuration allows for the separated charges to remain in contact with the conducting element, that is, the center conductor 31, for a longer time before colliding with the body of the coaxial cable 30. Optionally, a sealant (e.g., O-ring or epoxy), and, in particularly, an electrically conducting sealant, may be used to form a hermetic seal between the distal end 24/24A of the guide 18/18A and the cable 30.

Upon activation of the igniter 16, the energetic charge 14 in the upper housing 12 is detonated, releasing a shockwave. Without wishing to be bound necessarily by any theory, one contends that the shockwave passes through gas contained in the energy-focusing guide 18 to compress, heat, and accelerate the ionizable gas 25 in the direction of the shockwave front motion. The shockwave has an initial "detonation velocity." Detonation velocity is measured for the purposes of this invention in accordance with the technique set forth in John M. McAfee, Blaine W. Asay, A. Wayne Campbell, John B. Ramsay, Proceedings *Ninth Symposium on Detonation*, OCNR 113291-7 pp. 265-278 (1989). Examples of detonation velocities for many compositions are set forth in *Navy Explosive Handbook: Explosive Effects and Properties Part III*, 1998.

As the shockwave passes through the guide 18/18A and encounters the ionizable gas 25, the shockwave may slow somewhat. If the shockwave passing through the guide 18/18A has an effective velocity to excite gas molecules into a reactive transition state, the gas 25 begins to undergo exothermic decomposition and enters into a plasma state. The velocity needed to generate plasma will depend primarily upon the ionization potential of the gas 25 contained in the energy focusing guide 18/18A. Gas ionization potentials are reported in the CRC Handbook of Chemistry and Physics. For example, in the case of air, the detonation velocity is generally at least about 7 mm/μsec (millimeters per microsecond) and the effective velocity of the shockwave is generally about 6 mm/μsec at a temperature of at least about 10,000° C., and more particularly, at least about 20,000° C.—about 50,000° C., and even more particularly, at least about 50,000° C. where higher velocities are produced respectively. Other gases may have higher or slower ionization potential and require different effective velocities. Accordingly, in other embodiments, the detonation velocity may equal the effective velocity, alternatively the detonation velocity may be greater than the effective velocity or possibly, the detonation velocity may be equal to or less than the effective velocity.

The velocity of the shockwave as it passes through the gas 25 may be measured as follows. Fiber optic cables with a core diameter of 250 μm are passed perpendicular to the length of the guide 18/18A through both walls of the guide 18/18A. One end of the fiber is connected to a laser and the other end is connected to a silicon photodiode. The fiber that is inside the guide 18/18A has the low-index cladding removed, resulting in a fiber that is exposed to the atmosphere in the guide. Since the index-of-refraction of the atmosphere in the guide, initially air at ambient pressure, is considerably lower than the index-of-refraction of the fused silica core of the fiber, almost all of the laser light coupled to the fiber will remain in the fiber as is passes through the guide. However, when the higher-pressure shock wave passes by the fiber, the index-of-refraction of the air increases to the point that light begins to escape the fiber. This results in a measurable decrease in detected laser light as the shockwave passes the fiber optic. By placing a series of fiber optics at known locations along the length of the guide, the shock velocity in the guide can be calculated by dividing distance the fiber is from the energetic by the arrival time of the shock at the fiber.

As the shock waves and hot explosive gases from the energetic material 14 are propagated down the shock guide 18/18A, compressing the gas 25, the gas 25 decomposes to atoms and then the atoms become ionized into positively charged atoms and negatively charged free electrons within the shock guide 18/18A. Once the positive and negative charges begin to separate, self-generated magnetic fields form, leading to further separation. This effectively creates a high velocity (approximately 10 km/s) capacitor moving through the shock guide 18/18A. The configuration of the energy-focusing guide 18 captures and channels the created charge configuration to collide with the cable 30, completes the circuit and release a current into the cable 30 to be conducted for ultimate use. The current is useful to drive devices needing short duration voltage and currents, such as from about 10 μs or less.

As the current is imparted to the cable 30, and it begins to travel through the cable 30, the shock guide 18/18A is generally destroyed, i.e., the shock guide 18/18A provides a single shot use. Accordingly, multiple power generation devices 10 of the present invention generally are used for applications requiring multiple current discharges and/or needing firing redundancy for initiation.

Advantageously, the construction of the power generating devices 10 of embodiments of the present invention require small amounts of energetic charges. For example, according to one experimental test, a coaxial cable 30 conducted about 10 volts of electricity using a power generating device 10 including a 1 inch diameter/1 inch long housing 17 made of plastic (e.g., acrylic). The housing 17 was loaded with 20 grams of energetic charge, including 96 weight percent HMX and 4 weight percent binder (3 wt % polyacrylic elastomer, 1 wt % di-(2-ethylhexyl)adipate). The device 10 further included a polycarbonate cone, that is, a cone shape, selected as the energy-focusing guide 18. The guide 18/18A included a length of about 3 inches and an internal passageway 20/20A tapering continuously in diameter from 0.5 inches to 1.0 inches. An epoxy adhesive was used to join the distal end 24/24A of the energy-focusing guide 18/18A to the ordnance. Other shapes may be selected for other embodiments of the energy-focusing guide 18/18A. Without wishing to be bound by any theory, one contends that the energy-focusing device 18/18A is primarily responsible for increasing the efficiency of ionization and polarization of the gas 25 so that smaller amounts of energetic charge are required. The energy-focusing guide 18/18A constrains the shock and gas within the interior passageway 20/20A of the guide 18/18A. As the guide tapers to a smaller cross-sectional area, the energy is applied to a smaller volume of gas. This structural configuration results in a greater amount of local heating of the gas 25 and, ultimately, a larger amount of ionization of the gas. Additionally, the guide 18/18A confines the charges and plasma allowing time for the charge separation to occur without them dissipating to the ambient atmosphere on the outside of the guide 18/18A.

The power generator device 10 may be manufactured in any appropriate manner. One such embodiment for manufacturing the power generator device 10 includes inserting the initiator 16 through an aperture in the closed end of the housing 12. Adhesives, mechanical fasteners, tape, or the like may be used to retain the initiator 16 in place. The housing 17 is coupled generally with a hermetic seal, to the energy-focusing guide 18/18A using adhesive (e.g., epoxy), mechanical fasteners, or the like. The order for inserting the initiator 16, loading the charge 14, and coupling the energy-focusing guide 18/18A is not particularly important, and may be practiced in any sequence.

The power generator device 10 requires only a small mass of energetic material 14, such as, approximately 20 g, coupled to the shock guide 18/18A. Generally, the diameter of the guide 18/18A at the top is the same diameter as the charge 14. The diameter of the distal end 24/24A of the shock guide 18/18A is the diameter of a coaxial cable 30. With the coaxial cable 30 inserted into the bottom of the shock guide 18, the resultant electrical energy of the device 10 is captured and conducted to a remote location for use. The relatively inexpensive and compact nature of the device and the simplicity with which it operates makes the present invention ideal for many electrically supported systems for both military and civilian use.

Additional advantages and modifications will readily occur to those skilled in the art upon reference to this disclosure. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A method for generating power, comprising:
situating an energetic charge substantially adjacent to an initiator prior to an activation;
activating the energetic charge for producing a shockwave;
imparting the shockwave at an effective velocity and a temperature on a gas to ionize the gas for creating plasma and driving the plasma; and,
impacting the plasma on an electrical conductor for imparting an electrical current and voltage therethrough effective for generating power.

2. The method of claim 1, wherein the energetic charge comprises at least about 94 weight percent of a nitrate-containing compound.

3. The method of claim 2, wherein the nitrate-containing compound comprises a nitramine.

4. The method of claim 2, wherein the nitrate-containing compound comprises a nitramine, the nitramine is selected from at least one of HMX, RDX, and CL-20.

5. The method of claim 1, wherein the gas comprises air.

6. The method of claim 1, wherein the energetic charge includes a detonation velocity of at least about 7 mm/μsec.

7. The method of claim 1, wherein the effective velocity is at least about 6 mm/μsec.

8. The method of claim 1, wherein the temperature is greater than about 10,000° C.

9. The method of claim 1, wherein the temperature is greater than about 50,000° C.

10. The method of claim 1, wherein said impacting comprises focusing the plasma on the electrical conductor by an energy-focusing guide.

11. The method of claim 10, wherein the energy-focusing guide is a cylindrical shaped energy-focusing guide.

12. The method of claim 10, wherein the energy focusing guide is a tapered shape energy focusing guide.

13. The method of claim 10, wherein the energy-focusing guide comprises a distal end contacting the electrical conductor.

14. The method of claim 1, wherein the electrical conductor is a center conductor of an electrically conducting cable.

15. The method of claim 1, wherein the energetic charge includes a detonation velocity, said detonation velocity is greater than said effective velocity.

16. The method of claim 1, wherein the energetic charge includes a detonation velocity, said detonation velocity is equal to said effective velocity.

17. The method of claim 1, wherein said plasma generates a magnetic field.

18. The method of claim 1, further comprising decomposing the gas into ionized atoms.

19. A method for generating power, comprising:
situating an energetic charge substantially adjacent to an initiator prior to an activation;
activating an energetic charge, said energetic charge including a detonation velocity of at least about 7 mm/μsec for producing a shockwave;
imparting the shockwave on a gas at an effective velocity of at least about 6 mm/μsec and a temperature of at least 10,000° C.; and,
impacting the gas to an electrically conducting cable for imparting an electrical current and voltage therethrough effective for generating power.

20. The method of claim 19, wherein the energetic charge comprises at least about 94 weight percent of a nitrate-containing compound.

21. The method of claim 20, wherein the nitrate-containing compound is selected from at least one of HMX, RDX, and CL-20.

22. The method of claim 19, wherein said impacting comprises focusing the gas on a conductor by a focusing guide.

23. A device for generating power, comprising:
an energetic charge, said energetic charge includes a detonation velocity of at least about 7 mm/μsec;
an initiator for activating the energetic charge;
an energy-focusing guide operatively associated with the energetic charge for receiving a shockwave generated upon activation of the energetic charge, the energy-focusing guide comprising an inner portion where a gas is located in said inner portion; and,
an electrically conducting cable attached to the energy focusing guide for being impacted by the shockwave propagating through the energy-focusing guide,
wherein the initiator is situated substantially adjacent to the energetic charge prior to an activation.

24. The device of claim 23, further comprising a housing including
the energetic charge,
wherein said housing and said energetic charge are operatively joined to the energy focusing guide.

25. The device of claim 23, wherein the shockwave is propagated at an effective velocity, and
wherein said detonation velocity is greater than said effective velocity.

* * * * *